United States Patent [19]

Gray et al.

[11] Patent Number: 4,688,035
[45] Date of Patent: Aug. 18, 1987

[54] END USER DATA STREAM SYNTAX

[75] Inventors: James P. Gray, Chapel Hill, N.C.; Peter J. Hansen, Ridgefield, Conn.; Michael A. Lerner, Raleigh; Mark Pozefsky, Chapel Hill, both of N.C.

[73] Assignee: International Business Machines Corp., Armonk, N.Y.

[21] Appl. No.: 884,675

[22] Filed: Jul. 16, 1986

Related U.S. Application Data

[63] Continuation of Ser. No. 555,723, Nov. 28, 1983, abandoned.

[51] Int. Cl.[4] ............................................. H04Q 1/00
[52] U.S. Cl. ........................... 340/825.52; 340/825.44; 370/82; 370/83
[58] Field of Search ..................... 340/825.52, 825.53, 340/825.44–825.48; 370/82, 83, 85, 92–94, 99, 105, 110.1; 371/2, 41

[56] References Cited

U.S. PATENT DOCUMENTS

| | | | |
|---|---|---|---|
| 4,039,757 | 8/1977 | Frisone | 370/82 X |
| 4,156,111 | 5/1979 | Downey et al. | 370/83 |
| 4,161,719 | 7/1979 | Parikh et al. | 370/82 X |
| 4,168,469 | 9/1979 | Parikh et al. | 370/83 X |
| 4,225,919 | 9/1980 | Kyu et al. | 370/83 X |
| 4,309,764 | 1/1982 | Acampora | 370/83 |
| 4,403,322 | 9/1983 | Kato et al. | 370/110.1 |
| 4,410,889 | 10/1983 | Bryant et al. | 370/82 |
| 4,420,833 | 12/1983 | Noirel | 370/82 X |
| 4,512,017 | 4/1985 | Nici et al. | 370/110.1 |

*Primary Examiner*—Ulysses Weldon
*Attorney, Agent, or Firm*—Joscelyn G. Cockburn

[57] ABSTRACT

Disclosed is a communication transport message format for carrying control information, relevant only to a transport system and end user data. The end user data is prefixed by a length field. The length field is set to a value representing the number of bytes of user data plus the size of the length field. A bit in the length field is used as a "continuation" or more-to-come indicator. Length field values that are less than the number of bytes of the length field are used to prefix control information.

16 Claims, 9 Drawing Figures

END USER DATA STREAM SYNTAX

This is a continuation of co-pending application Ser. No. 555,723 filed on 11/28/83 now abandoned.

BACKGROUND OF THE INVENTION

(1) Field of the Invention

The present invention relates to communication networks in general and more particularly to the protocols which are used to transport information within the networks.

(2) Prior Art

The use of computer network systems for processing and transmitting data is well known in the prior art. A typical computer network system consists of at least one host computer running under some type of operating system, communication controllers, a communication medium and a plurality of end users (terminals, printers, displays, etc.). The host computer is connected, via communication media, to either a communication controller or an end user terminal. The communication controller interfaces with other communication controller or end user terminals via the communication medium. The communication medium may be telephone lines, channels, satellites, etc. By entering a request at a user terminal, a user may extract data from the host computer. Similarly, a user may enter information on a terminal and have it transmitted to the host computer for processing and/or to another terminal in the network.

In addition to the physical structure, the prior art computing systems are controlled by a system architecture which ensures the orderly flow of information through the system. The prior art describes several types of architectures. For example, an overview of the architecture used in computer networks is given in an article entitled, "Computer Network Architecture," by S. Wecker in *Computer*, September 1979. Another overview, including a description of System Network Architecture (SNA) is given in an article entitled, "An Introduction to Network Architectures and Protocols," by P. E. Green and printed in the IBM System Journal, Vol. 18, No. 2, 1979. In these articles, the various computer networks such as SNA, DMA, ARPANET, etc. are described by means of hierarchical architectural layers, where the lowest layer relates to the physical communication lines interconnecting various user nodes of the network and where the highest level concerns the conversation per se between the various end users of the network.

In an attempt to standardize network architecture, the International Organization for Standardization (ISO) has adopted a model which is described by Herbert Zimmerman in an article entitled, "OSI Reference Model—the ISO Model of Architecture for Open Systems Interconnections," *IEEE Transactions on Communications*, April 1980. The model architecture consists of seven layers, namely: physical, data link, network, transport, sessions, presentation and application layers. The present invention mainly concerns the presentation service layer of SNA which relates to the information unit which is used to transmit information between two end users.

The prior art utilizes "Information Units" with different type formats for carrying messages through the network. Notwithstanding the type of format, the prior art Information Units are plagued by a common problem; namely, how to identify the length of a particular message and how to distinguish between control information and user data. The control information is used by the presentation layer while the user data is for an end user.

One prior art solution is the use of delimiters to bracket the message. A beginning delimiter is used to signify the beginning of a message and an end delimiter is used to signify the end of a message. In addition to the delimiter and identification marker is used within the message to differentiate between "user data" and "control information."

Although the above information unit and technique works well for the intended purpose, it is not very efficient. This is so because the receiving node must analyze the message to determine the type of information. The analysis takes time which tends to slow down the performance of the overall system. Moreover, the prior art information unit is not easily adapted to transport control and/or user data in a common data stream. Finally, there are several applications in which predefined delimiters cannot be used to signify the start and end point of user data.

SUMMARY OF THE PRESENT INVENTION

It is a general object of the present invention to provide a more efficient information unit for carrying information within a communication network.

It is a more specific object to provide an information unit which carries mixed types of information (i.e., user data and control information) in a common data stream.

It is another object of the present invention to provide an information unit which transports variable length data.

The above and other objects are achieved by an information unit in which the user data and/or system control information is preceded by a length field. The value of the length field is the sum of the number of bytes for the user data plus the number of bytes for the length field. Values that are less than the length (number of bytes) of the length field are used to prefix control information. By prefixing user data with valid predefined length field values and control information with non-valid length field values, a common information unit is provided to transport user data and control information in a common bit stream.

In one feature of the invention a mode bit in the length field is used to chain user data. An "on" bit signifies the coming of more data. An "off" bit signifies the end of data.

The foregoing features and advantages of the invention will be more fully described in the accompanying drawings.

DETAILED DESCRIPTION OF THE PREFERRED EMBODIMENT

The invention to be described herein is intended to be a general vehicle for carrying data and control information throughout a computer network system. This being the case, the invention is not restricted to any specific type of computer network. However, it works well with the IBM SNA network which uses the SNA architecture and protocols and as such will be described in that environment. However, this should not be construed as a limitation on the scope of the present invention since it is within the skill of one skilled in the computing art to use the invention as is disclosed herein or with slight modification to transport information in other then the IBM SNA network.

A typical SNA network is described in the IBM manual, "Advanced Communication Functions for Virtual Telecommunications Access Method," GC27-0463-2, February 1981. The SNA network utilizes the system network architecture (SNA) to allow terminals, application programs, and other logical resources to communicate with one another using SNA entities called logical units (LUs). A more detailed description of the architecture and network is given in the above referenced manual which is incorporated herein by reference.

Figure 1A:
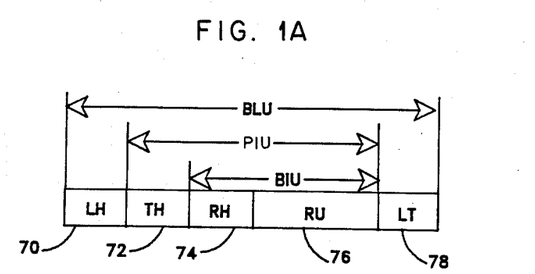
FIGS. 1A–1C show the format for the communication transport unit (CTU) according to the teaching of the present invention.
Figure 1B:
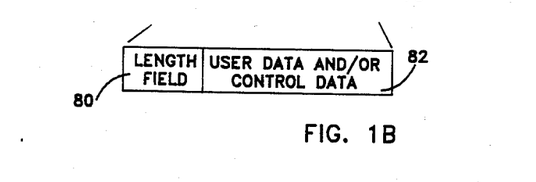
Figure 1C:
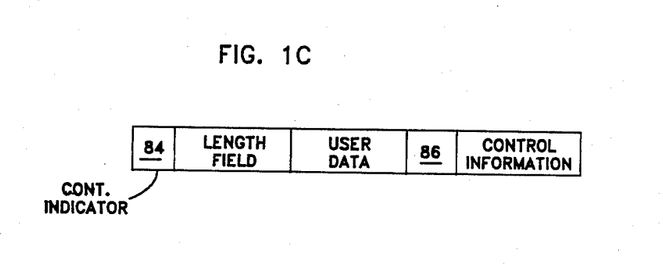

FIGS. 1A-1C show the format for the communication transport system according to the teaching of the present invention. This transport system is the vehicle which transports information (user data and/or control data) throughout the network (to be described hereinafter). The format includes a link header (LH) 70, a transmission header (TH) 72, a request-response header 74, a request-response unit (RU) 76, and a link trailer (LT) 78. The request-response header and the request-response unit form the basic information unit (BIU). The basic information unit combines with the transmission header to form the path information unit (PIU).

Finally, the path information unit combines with the link header and link trailer to form the basic link unit (BLU). A basic link unit may include one or more PIUs. It should be noted that as the basic information unit travels through the various SNA levels the additional units are added. The basic information unit is the unit that travels from end user node to another end user node in the network. As will be explained subsequently, it is the content of this unit that is modified according to the teaching of the present invention to provide a more efficient transmission vehicle. The transmission header contains information which guides the BIU through the network. The transmission header comprises address information and other necessary information for transmission control. The link header and link trailer are added to the PIU to control the transmission of a PIU over a link.

FIG. 1B represents the expanded RU. The expanded RU includes a length field indentified by numeral 80. The length field 80 is joined to a data field identified by numeral 82. Data field 82 may be used to transport end user data and/or control data. As will be explained subsequently, in order to determine whether data field 82 contains user data or control data, one has to examine the contents of the length field 80. The primary function of the length field 80 is to identify the number of user data bytes that are contained within the data field 82.

Note that as the maximum length of the RU is specified at session creation time and is typically less than the length of a user data stream, it may take many RUs to transport a particular user data stream. In fact, when more than one user data stream (each one composed of a length field and user data) is to be sent, the following data stream may not start on an RU boundary.

A condition which is imposed on the length field is that its transmitted value must be equal to the number of bytes in the user data field plus the number of bytes in the length field itself. This means that if N bytes are designated for the data field and M bytes for the length field, respectively, then the length field must be set, at data generation time, to M+N. When the data is received at a destination logical unit (LU), the LU knows that the user must process N bytes of user data. The remaining (M+N)−N value represents the number of bytes designated for the length field. It should be noted that the number of bytes which are designated for the length field may be determined at system definition or session setup time.

Because the length field is of finite length the user data might be too long to be described by the length field. To accommodate such large amounts of user data, an indicia is provided in the length field and is used as a "continuation" (cont.) or more-to-come indicator. When the user data is too great to be coded in the number of bytes assigned for the length field, some arbitrary amount is encoded, the continuation indicator is turned "on" to a first state and the remainder of the user data is put into the following logical message (with the properly encoded length field). When the last portion of the user data is placed in the following logical message, the continuation indicia is placed in a second state (i.e., turned off).

In the preferred embodiment of this invention, the continuation indicator is the left-most bit of the length field. In FIG. 1C the continuation indicator is identified by numeral 84. It should be noted that any other appropriate bit in the length field can be used to indicate the coming of additional data or the end of data without departing from the scope of the present invention.

Referring again to FIG. 1C, since the value in length field 80 has to be the sum of the length field and the number of bytes of user data, there are some values which are illegal to be used in the length field. These illegal values are placed in the control data identification field 86 to identify control data. It is therefore clear from FIG. 1C that by prefixing the length field with a continuation indicator, prefixing the user data field with a length field, and by prefixing the control information with a control information identification code field, the communication transport system of the present invention can transport mixed variable length user data and system control data in the same data stream.

It should be noted that the user data and system control data are distinguished from each other based on the values in the length field. Invalid values in the length field indicate the presence of system control information only whereas valid lengths or values indicate user data. This allows user data to be a transparent bit stream. In addition. the length field itself may be used as a total system control or system control information may follow the length field as a formatted data stream.

An example will now be used to demonstrate the operation of the above described communication transport system. Suppose 50,000 bytes of user data were to be transmitted. A further system limitation is that each transmission must contain less than 32,767 bytes. One might set the length field of the first logical message to be 27,002 (consisting of 27,000 bytes of user data and 2 bytes of length field) with the continuation indicator set in the first state "on". In the second logical message the length field indicator is set in the second state (turned "off") and the second logical message in 23,002. By examining the figure or number, after removing the number of bytes assigned to the length field, the user data adds up to 50,000 bytes. It should be noted that the number of logical messages can be continued so long as each of the messages is less than the number of bytes which are allowed for a particular system.

In this example the (hexadecimal) length field values 0000, 0001, 8000, and 8001 are illegal because all logical messages must have a length of two or greater value. These illegal values can be used as "escapes" to signify non-end user logical messages. With respect to FIG. 1C, those illegal values can be placed in the control data indentification field 86 to prefix control information.

Figure 5:
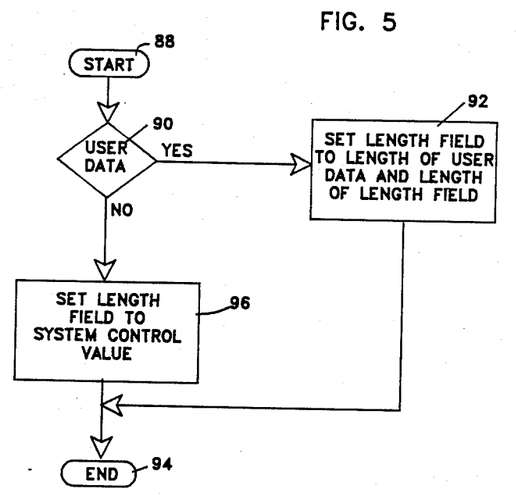
FIG. 5 shows a flow chart of a computer program for creating a data stream in the format of FIGS. 1A–1C.

FIG. 5 shows an algorithm for processing a data stream to fit in the protocol of the above-described communication transport system. The first block in the algorithm is identified by numeral 88. It is an entry block and signifies the point where the processor (to be described later) enters the formatting algorithm. The program next descends to decision block 90. In block 90 the program checks to see whether the data to be transported is user data. If it is, the program enters block 92 where it sets the length field to a value equal to the size of the user data plus the size of the length field. The program then descends and escapes from the program via block 94. If the data is not user data, the program then descends into block 96. In block 96 the program sets the length field to an "escape" value and exits from the program via block 94.

Figure 6:
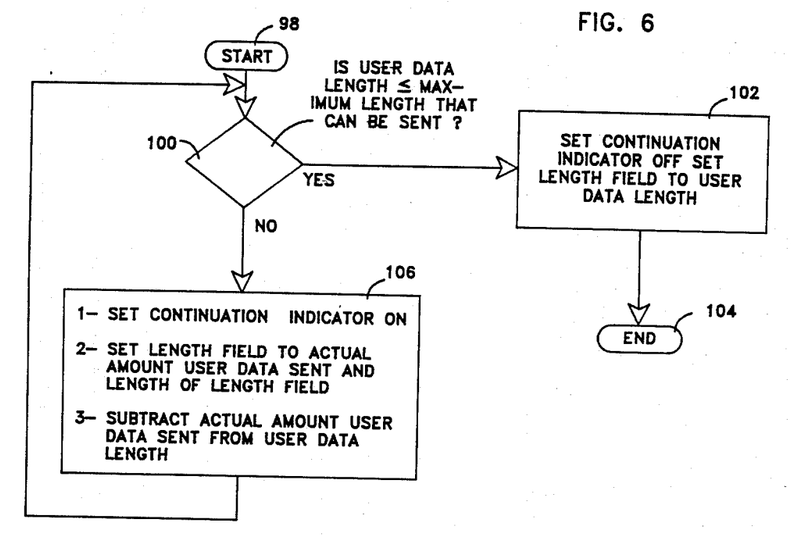
FIG. 6 shows a flow chart of a computer program which sets the continuation or mode bit.

FIG. 6 shows a flow chart of an algorithm for setting the continuation indicator. The program includes start block 98 through which the program enters the algorithm. The program, via decisional block 100, checks to see whether the user data length is less than or equal to the maximum length that can be sent through that particular system. If it is, the program enters block 102. In block 102, the program sets the continuation indicator in an "off" state and sets the length field to user data length. The program then escapes through end block 104.

If the user data is greater than the maximum length which can be sent, the program enters block 106. In block 106 the program sets the continuation indicator in the "on" state, sets the length field to the actual amount of user data sent plus the value of the length field, and subtracts the actual amount of user data sent from user data length. The program then enters into a loop until all the user data is transmitted. The program then sets the continuation bit in the "off" state and escapes from the program via block 104.

Figure 4:
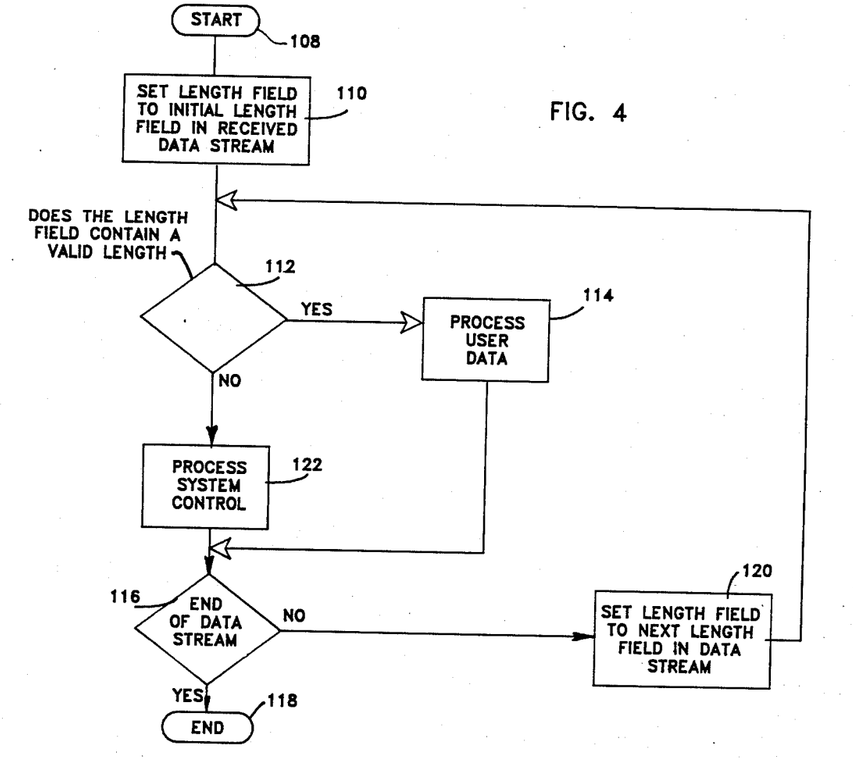
FIG. 4 shows a flow chart of a computer program for processing a data stream configured in the format of FIGS. 1A–1C.

FIG. 4 shows the flow chart of an algorithm for processing the data stream. This algorithm would be implemented in the processor of the node which receives a message. The entry point of the algorithm is a start block indentified by numeral 108. The program then descends into block 110 where it sets the length field to the initial length field in received data stream. The program then descends into decisional block 112. In block 112 the program checks to see whether the length field contains a value value. If it does, the program enters block 114. In block 114 the received data is processed as user data. The program then descends into decisional block 116. It then checks to see if it is the end of the data stream. If it is, the program descends into end block 118.

If the program decides that this is not the end of the data stream, it then enters block 120. In block 120 the program sets the length field to the next length field in the data stream and loops into block 112. As before, in block 112, the program checks to see if the length field contains a valid length value. If it does not, the program enters block 122 where the data is processed as control information. In essence, the length field of received messages is examined. If it contains a valid length value, the data is passed to the end user where it is processed as user data. If the value in the length field is invalid, the data is passed to the control section of the LU where it is processed as control data.

Figure 7:
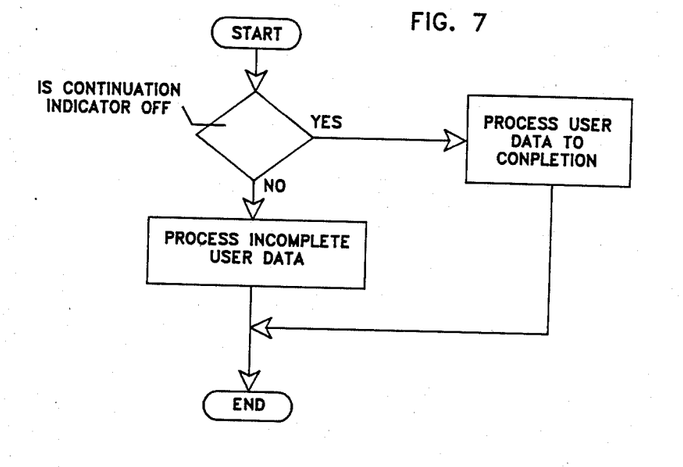
FIG. 7 shows a flow chart of a computer program for processing a bit stream with a continuation bit therein.

FIG. 7 shows a flow chart of an algorithm for processing the continuation indicator at the receiving node. In essence, the algorithm tests the status of the continuation bit. If the bit is on, the data is processed as incomplete user data. If the bit is off, the data is processed as complete user data.

Figure 2:
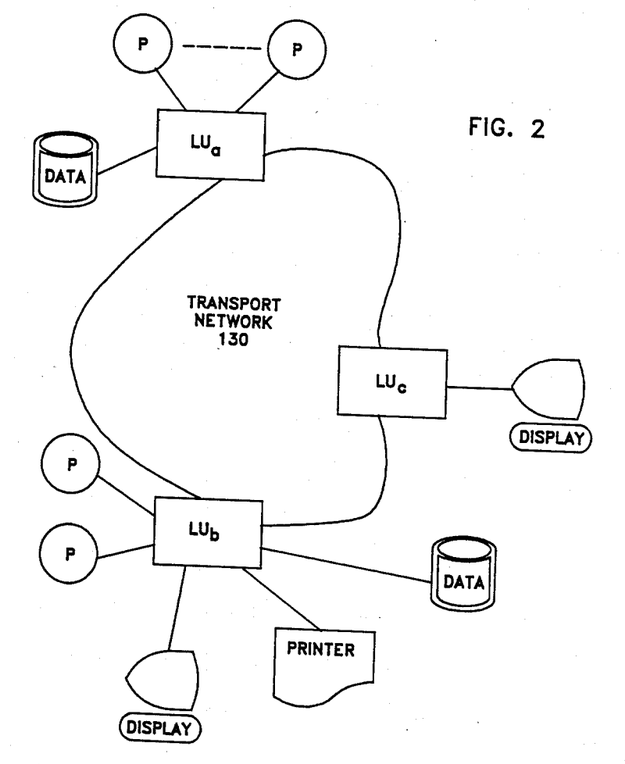
FIG. 2 shows a schematic of a computer network. The CTU of FIGS. 1A–1C can be used to carry data and/or control information in the network of FIG. 1.

FIG. 2 shows the structure for a basic SNA network. The above described communication transport system can be used for transporting messages between the LUs of the network of FIG. 2. The system is comprised of an SNA transport network identified by numeral 130. SNA transportation networks are well known in the prior art and as such the details will not be given. Suffice it to say that the transport network is comprised of a plurality of nodes (not shown) and transmission links (not shown) for interconnecting the nodes. A plurality of logical units identified by $LU_a$, $LU_b$, $LU_c$, are connected to the transport network. Each of the logical units is fitted with application programs P, I/O devices and associated data bases. For example, $LU_a$ may be an application sub-system with its application programs and data bases. $LU_a$ is structured so that its interface to the program is user friendly while the interface to the transport network is such that messages are efficiently formatted for transmission in the network.

Still referring to FIG. 2, $Lu_a$ is further characterized by its ability to communicate in a "high level user friendly language" with its own attached programs. As a result of the communication, a message is assembled, formatted, in the format of the present invention, and transmitted to $Lu_a'$ (not shown). The structure of $Lu_a'$ is similar to that of $LU_a$. The function of $LU_a'$ is to process messages from $LU_a$ and forward them to programs (not shown) which are coupled to $LU_a'$. The presence of $LU_a$ and $LU_a'$ enables program-to-program communication. A set of user friendly language called "verbs" is published in "Transaction Programmer's Reference Manual for Logical Unit 6.2" (GC30-3094-1). $LU_b$ may be an intelligent office work station like Displaywriter with its local office application program, local document storage, keyboard/display, and printer. Finally, $LU_c$ could be a traditional fixed function display terminal. Of course, other types of devices and LUs can be connected to the network.

Figure 3:
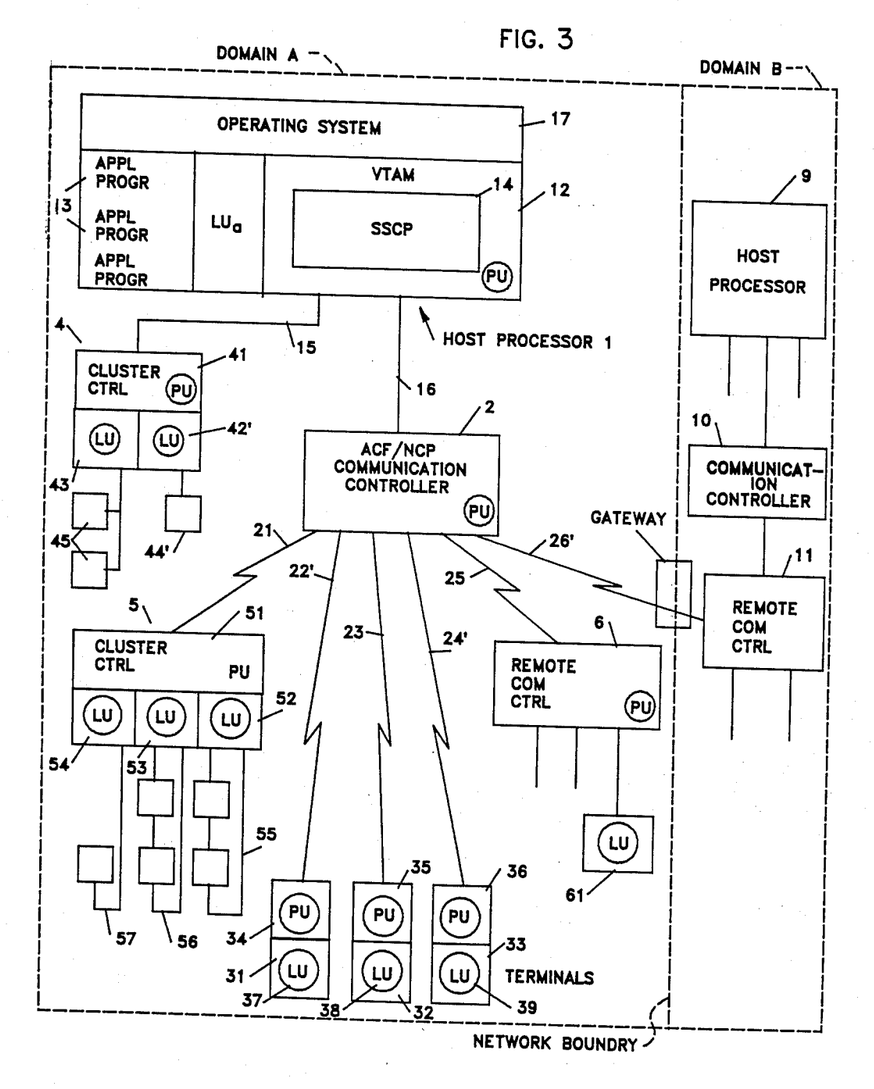
FIG. 3 shows a block diagram of the components of a computer network.

FIG. 3 shows a detailed schematic of network 130 (FIG. 2) including two domains (A&B). Since the structure of both domains is substantially the same, the details are given for domain A only with a skeleton showing to represent the components of domain B. The network includes a host processor 1 located in node A and a host processor 9 located in domain B. The host processors may be any conventional host computers. In the preferred embodiment of this invention the host computers are IBM System 370. The host processor 1 includes an operating system 17, a plurality of application programs 13, and a virtual telecommunication access method (VTAM) 12. A logical unit (LU$_a$) couples the application program to VTAM. The structure of LU$_a$ is identical to the structure of the above-described LU$_a$. Essentially, LU$_a$ accepts instructions and commands from an application program to formulate a message and transport the message from node A to node B. Of course, the message is formatted in the format of the above described communication transport system.

VTAM contains a system service control point (SSCP) component 14. VTAM is an IBM communication access method which is well known in the prior art and as such details will not be given. Suffice it to say that the system service control point 14 is a component of VTAM that manages a domain of the network. The SSCP performs functions such as bringing up the network, shutting it down, assisting and establishing and terminating the communication between network addressable units, utilizing the above described algorithm for formulating transportation units and reacting to network problems, such as failure of the link or control unit. To perform these functions, the SSCP must be able to communicate with physical units (PU) and logical units (LU). Usually, the communication is within its own domain. A more detailed description of the VTAM/SSCP is given in "General Information for Virtual Telecommunication Access Method" (GC27-463 and GC27-0462). The cited literature is incorporated herein by reference.

Still referring to FIG. 3, a communication controller 2 is attached to the host 1 via a channel 16, and a local cluster controller 4 is attached over channel 15 to the host. The communication controller 2 is a transmission control unit with processing controlled by advanced communication function (ACF) network control program (NCP) that resides in its storage. The ACF/NCP is well known to those skilled in the art and as such details will not be given. Suffice it to say that the main purpose of the network control program is to transmit data received from the host processor 1 to terminals, clusters, or other NCPs and to receive data from the terminals, clusters, or other NCPs and sends it to the host. The NCP can process data in various ways as it passes through the controller. In controlling the flow of data, the NCP must interact with portions of the controller hardware. On the line side, the NCP interacts with the communication scanner (not shown) and on the channel side it interacts with the channel adapter (not shown). A more detailed description of the communication controller and its associated control programs is given in the above referenced manual.

The communication controller 2 is connected to a remote cluster controller 5 over a synchornous data link control (SDLC) link 21. The communication controller 2 is also connected over link 25 to a remote communication controller 6 and by means of links 22', 23 and 24' terminals 31, 32 and 33. A cross domain link 26' connects the communication controller to a remote controller 11 in domain B. In domain B there is also shown a communication controller 10 connected between the host processor 9 and the remote communication controller 11. It should be noted that the communication controller 2 and its controlled program are substantially the same as the remote controller 11.

Each element, in the network of FIG. 3, that can send or receive data is assigned a network address and is known as a network addressable unit (NAU). The network address uniquely identifies the element, regardless of whether the element is a device such as a terminal or terminal control unit, programs such as application programs, a cluster controller being attached to a host processor or a portion of an access method, such as VTAM. The network address contains information necessary to route data to its destination. It ought to be noted that SNA defines three types of network addressable units; namely: system service control point (SSCP), physical units (PU), and logical units (LU).

A physical unit (PU) is represented in FIG. 3 as an encircled PU. It is a portion of the device, usually programming or circuitry of both, that performs control functions for the device in which it is located and, in some cases, for devices that are attached to the device that contains the PU. For the device under its control the physical unit takes action during activation and at deactivation during error recovery and resetting synchronization, during testing, and during gathering of statistics and operation of the device. Each device in the network is associated with a physical unit. In the local cluster controller 4 there is a physical unit 41 and in the remote cluster controller 5 there is a physical unit 51. There are also physical units in the local communication controller 2 and the remote communication controller 6.

A logical unit (LU) is a device or program by which an end user, a terminal operator, and/or input/output mechanism gains access to the network. The logical unit can be logic circuits or programs associated with terminals, sub-system stand-alone device or application program. As far as the network is concerned, the logical unit (LU) is an access port into the network. The logical unit may or may not be the original source. The contents of the request for the information for which the request is based may have originated at the device controlled by the logical unit. Similarly, the network sees a logical unit as a destination of a request (RU) unit. In FIG. 3 a logical unit is shown as an encircled LU. In the host processor 1 there are shown a plurality of application programs logical units 13. In the local cluster controller 4, there are two logical units 42' and 43 controlling the devices 44' and 45. Cluster controller 5 contains logical unit 52-54 controlling devices and loops 55-57. Each of these terminals 31-33 is comprised of PUs 34-36 and LUs 37-39. This concludes the detailed description of the invention.

While the invention has been particularly shown and described with reference to the preferred embodiments thereof, it will be understood by those skilled in the art that various changes in form and details may be made therein without departing from the spirit and scope of the invention.

Having thus described our invention, what we claim as new, and desire to secure by Letters Patent is:

1. In a computer network having a plurality of nodes with one or more host computers controlling resources associated with a node, an apparatus for generating an improved variable length message for carrying either user data or control information between network addressable units connected to said nodes comprising:

means at each network addressable unit for generating a variable length message including a first field of M data bytes, and a remainder second field concatenated to the first field, said first field having a data value equal to the summation of the number of bytes in said first and second fields which lies within a range of data for identifying said second field as user data, and having a data value outside of said range for identifying said second field as containing control information.

2. The variable length message of claim 1 further including an indicium preceding the first field, said indicium set to a first state if more than one transmission is required to send the data or set to a second state if one transmission is required to send the data.

3. The variable length message of claim 1 further comprising a data indicium in said first field for identifying said second field data as a part of a larger data group contained in subsequent variable length messages.

4. In a computer network having a plurality of nodes with one or more host computers controlling resources associated with a node, a method for transporting information between network addressable units connected to said nodes comprising the steps of:
   (a) transmitting from one of said addressable units a variable length message including a first field of a known number of data bytes M, and a second field concatenated to the first field containing user data or control information data, said first field of data having a first or second value for identifying whether said second field comprises user data or control information data, said first value lying within a range of data and containing the summation of the number of bytes in said first and the number of bytes in said second field, and said second value lying outside of said range of data;
   (b) receiving the message at another of the network addressable units;
   (c) examining the message to determine whether said first or second value is present in said first field; and
   (d) identifying the information immediately following the first field as user data if said first value is present, and identifying said information following said first field as control information data if said second value is present.

5. The method set forth in claim 4 wherein said first field of step (a) further includes an indicium having at least two states preceding the first field.

6. The method set forth in claim 5 further including the steps of:
   (e) examining said indicium for determining its state; and
   (f) characterizing the user data as being completed only if the indicium was in an "off" state when received or as being incompleted only if the indicium was in an "on" state when received.

7. The method of claim 4 wherein said examining step includes comparing the value contained in said first field with the number of bytes M in said first field.

8. In a computer network having a plurality of nodes with one or more host computers controlling the resources associated with a node, an apparatus for generating an improved variable length message for carrying user data and control information between network addressable units connected to said nodes comprising:
   means at each network addressable unit for generating a variable length message including a header, a first field of M data bytes having a value A equal to the summation of the number of bytes in said first field and a following second field, said value lying within a predetermined range of data identifying said second field concatenated to the first field as user data, a third field having a value outside of said range identifying a following fourth field of data concatenated with said third field as containing control information.

9. The apparatus of claims 1 and 8 wherein said range of data has a lower limit equal to M.

10. In a computer network having a plurality of nodes with one or more host computers controlling the resources associated with a node, a method for transporting user data and control information between network addressable units connected to said nodes comprising the steps of:
    (a) transmitting from one of said addressable units a variable length message including a first field of a known number of data bytes M, followed by a second field concatenated to the first field, a third field following said second field and a fourth field concatenated with said third field, said first and third fields including data having either a first value which contains the summation of the number of bytes in said first and a respective concatenated subsequent field within a predetermined range identifying an immediately following field as user data, or a second value outside of said range to identify a following field as containing control information data;
    (b) receiving the message at another of the network addressable units;
    (c) examining the message to determine whether said first or second value is present in said first and third fields; and
    (d) identifying the information immediately following the first and third fields as user data if said first value is present, and identifying said information following said first and third fields as control information data if said second value is present.

11. The method of claim 10 wherein said examining step includes comparing the value contained in said first and third fields with the number of bytes M in said first and third fields.

12. The method of claims 4 and 10 wherein said range of data has a lower limit of M.

13. In a computer network having a plurality of nodes with one or more host computers controlling the resources associated with a node; a method for transporting user data and control information between network addressable units comprising the steps of:
    (a) transmitting from one of said network addressable units a variable length message, said message if containing user data only includes a first field M bytes long having a value which is the summation M+k of the number of bytes M in said first field and a number of user data bytes k, and which lies within a permissible range of values, followed by a k byte second field concatenated to the first field and carrying the user data;
    if containing control information only, a value falling outside the range of values which includes said summation M+k in the first field followed by control information in the second field;
    if containing both user data and control information, a value of said summation M+k is coded in the first field, followed by k bytes of user data in the second field, followed by a third field with a value falling outside the range of values which includes M+k followed by a fourth field containing control information;

(b) receiving the variable length message at another network addressable unit;

(c) decoding and examining the first field of M bytes, if the value is this field falls outside of a first range of values which includes said summation M+k, identify the immediately following information field as control and terminate receiving this message; if the value in the first field falls within the range of values including said summation M+k, identify the following information field as user data and determine the value k from the length of said user data; thereafter, examine and decode the third field having a length M which immediately follows the k byte user data field to determine if the value encoded falls outside of the range of values which includes said summation M+k, and, if so, receiving the information in the fourth field immediately following said third field as control information and terminate receiving this message.

14. The method set forth in claim 13 further including the step of setting an indicium, in said first field, to a first state if multiple transmissions are required to send the data and setting said indicium to a second state if only one transmission is required to send the data.

15. The method set forth in claim 13 wherein step (a) includes transmitting multiple variable length messages.

16. The method set forth in claim 15 wherein the messages are being transmitted in any order and sequence.

* * * * *